E. L. SMITH.

ANNUAL OR TERM PASS, FRANK, OR FORM HOLDER AND WRITING FRAME.

APPLICATION FILED DEC. 7, 1916.

Reissued Feb. 13, 1917.

14,258.

2 SHEETS—SHEET 1.

Inventor

Witness

Ernest L. Smith

By H. B. Willson & Co.

Attorneys

THE NORRIS PETERS CO., PHOTO-LITHO., WASHINGTON, D. C.

E. L. SMITH.

ANNUAL OR TERM PASS, FRANK, OR FORM HOLDER AND WRITING FRAME.

APPLICATION FILED DEC. 7, 1916.

Reissued Feb. 13, 1917.

14,258.

2 SHEETS—SHEET 2.

Witness

C. [illegible]

Inventor

Ernest L. Smith

By H. B. Willson & Co

Attorneys

THE NORRIS PETERS CO., PHOTO-LITHO., WASHINGTON, D. C.

UNITED STATES PATENT OFFICE.

ERNEST L. SMITH, OF SALT LAKE CITY, UTAH.

ANNUAL OR TERM PASS, FRANK, OR FORM HOLDER AND WRITING-FRAME.

14,258. Specification of Reissued Letters Patent. Reissued Feb. 13, 1917.

Original No. 1,198,590, dated September 19, 1916, Serial No. 18,756, filed April 2, 1915. Application for reissue filed December 7, 1916. Serial No. 135,698.

*To all whom it may concern:*

Be it known that I, ERNEST L. SMITH, a citizen of the United States, residing at Salt Lake City, in the county of Salt Lake and State of Utah, have invented a new, original, and useful Improvement in the Form of an Annual or Term Pass, Frank, or Form Holder and Writing-Frame, of which the following is a specification.

My invention relates to improvements in the methods now employed in issuing and writing annual or term railroad, steamship and sleeping car passes, express and telegraph franks, and the making of a permanent record thereof upon card forms prescribed for the recording of such passes or franks, numbered to correspond with the passes or franks to be issued or unnumbered as may be desired; also the writing and manifolding of other forms of varying sizes that may be used for other purposes.

The objects of my improvement are: first, to provide a holder and frame for separate passes, franks or other forms which will retain same in a true position while being filled out on an ordinary typewriter or other writing device; second, to afford facilities in one writing operation on a typewriter or other writing device for (*a*) filling out separate passes, franks or other forms; (*b*) making manifold counterparts of the matter written on the pass, frank or other form by the use of carbon paper, upon conforming record cards or other forms, and (*c*) filling in additional record or other data required to be shown on the record cards or other forms after the writing of the pass, frank or other form is completed; third, to provide a uniform method which common carriers may follow in issuing and writing annual or term passes or franks and making record thereof, under the regulations prescribed by the Interstate Commerce Commission dealing with the subject of uniform methods for the issuing and recording of passes by carriers, effective January 1, 1912; and fourth, to provide a method by which carbon counterparts of matter written upon blanks or forms of one size used for any purpose, may be transmitted by the use of carbon paper and impressed upon other blanks or forms of a larger size used for any such purpose. I attain these objects by the use of a holder and frame as illustrated in the accompanying drawings, in which—

Figure 1:
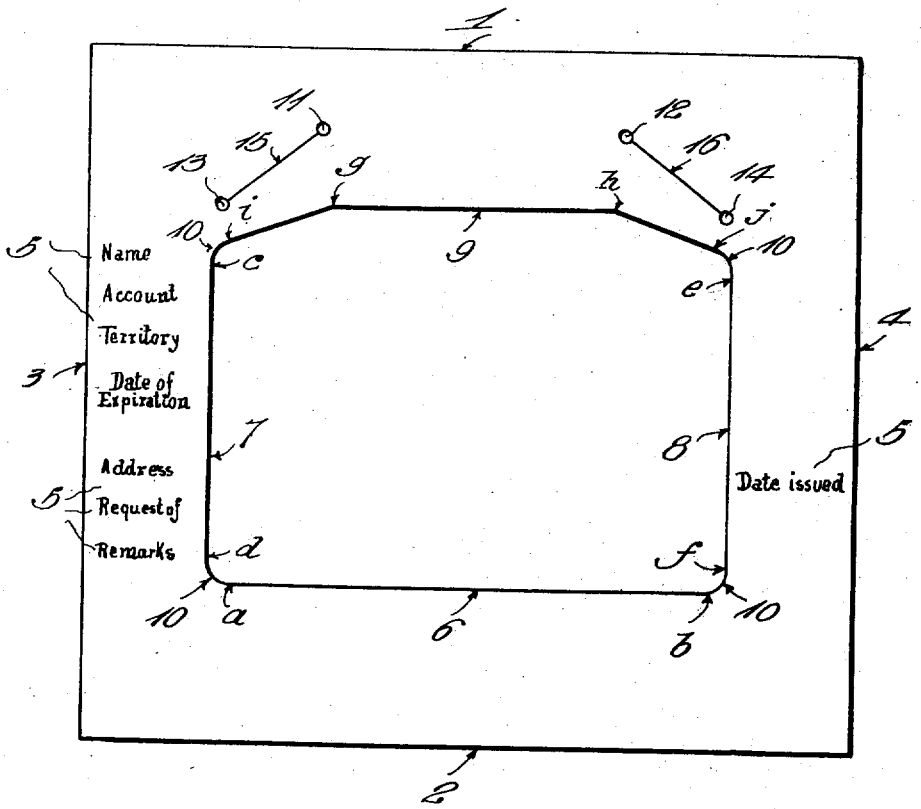
Figure 1 represents a front elevation of a frame or holder constructed in accordance with this invention.
Figure 3:
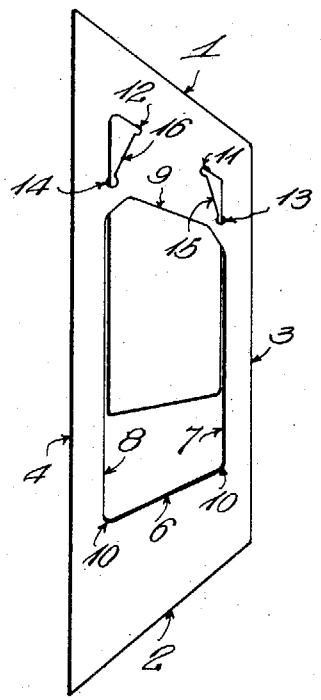
Fig. 3 is a perspective view taken from the rear showing the pass blank in position.

Numerals 1 and 2 indicate, respectively, upper and lower outer parallel edges of the frame. Numerals 3 and 4 indicate outer parallel side edges of the frame.

Numeral 5 indicates marginal lettering on the side faces of the frame, the vertical spacing of which corresponds with (*a*) the vertical spacing of the printed or engraved matter on the pass, frank or other form, (*b*) the matter to be written on the pass, frank or other form, (*c*) that printed and required to be shown on the record cards or other forms, and (*d*) the vertical spacing mechanism of a standard typewriter or other writing device; it being intended, however, that the lettering shown in the drawing on the side faces of the frame is illustrative only and may be changed, altered or varied from as may be required for any purpose, without invalidating my claims.

Numerals 6, 7, 8, 9 and 10 combined indicate inner edges of the frame bounding an opening in the frame which is made by cutting out this section of the sheet, substantially as shown in the drawing, either by hand or, preferably, by the use of dies provided for this purpose. The lower edge of this opening (6) is parallel to the lower edge of the frame (2) between points *a* and *b*. The left side edge of this opening (7) is parallel to the corresponding outer side edge of the frame (3) between points *c* and *d*. The right side edge of this opening (8) is parallel to the corresponding outer side edge of the frame (4) between points *e* and *f*. The upper edge of this opening (9) is on an angle from point *i* to point *g*, parallel to upper edge of the frame (1) from point *g* to point *h*, and on an angle from point *h* to point *j*. The round corners of this opening (10) are on a radius necessary to provide a continuous connected edge of opening from left side edge (7) to lower edge (6) between points *d* and *a;* from lower edge (6) to right side edge (8) between points *b* and *f;* from right side edge (8) to upper edge (9) between points *e* and *j*, and from upper edge (9) to left side edge (7) between points *i* and *c*.

Numeral 11 indicates upper left perforation. Numeral 12 indicates upper right perforation. Numeral 13 indicates lower left perforation. Numeral 14 indicates lower right perforation; the size of and distance between said upper and between said lower perforations to be variable according to the requirements for which the holder and frame is used. Numerals 15 and 16, respectively, indicate connecting slits cut centrally and on an angle from upper left perforation (11) to lower left perforation (13) and from upper right perforation (12) to lower right perforation (14), the respective perforations and slits thus combined providing horizontal and vertical guides and retaining apertures or openings in the frame for securing the pass, frank or other form to be written, in the frame in a position partly over the opening in the frame and corresponding to the spacing of the marginal lettering, the printing on the record cards or other forms, and the spacing mechanism of a typewriter or other writing device.

Figure 2:
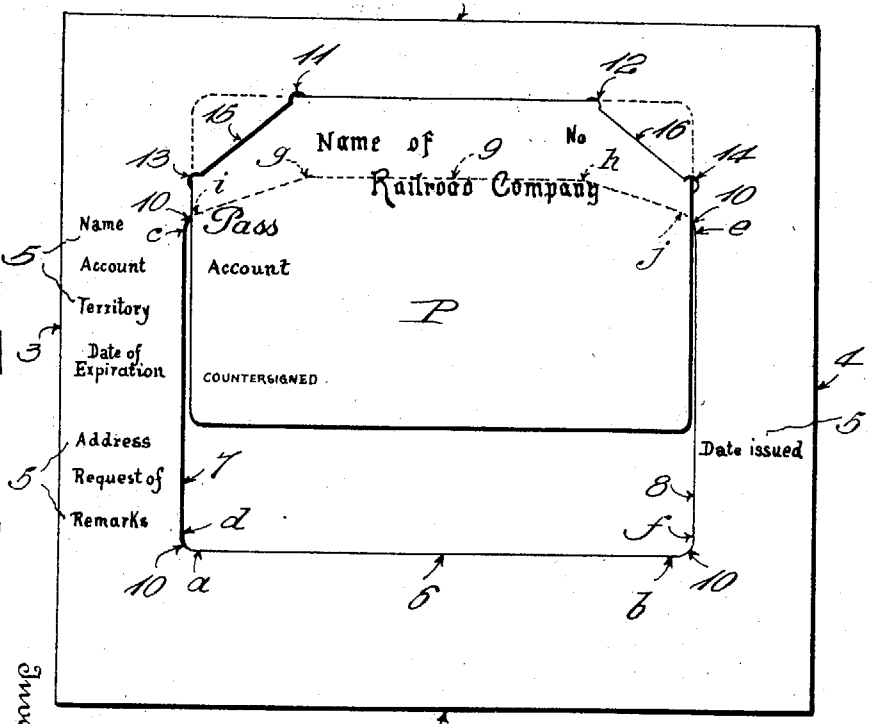
Fig. 2 is a similar view showing a pass blank to be filled in arranged in operative position therein.

In Fig. 2 a pass blank or form P is shown disposed in operative position within the holder corresponding substantially in width to the length of the opening in said holder, the upper corners of said pass being designed to extend through the slits 15 and 16 which are disposed above the opening and the side edges of the pass blank P snugly engage the outer edges of the perforations 13 and 14 respectively and the contact thus afforded between these respective edges supplemented by the pressure of the edges of the slits 15 and 16 against the front and back faces of the pass blank retains the pass blank or other form in the holder and frame in a position to enable it to be conveyed through a typewriter or other writing machine. It is thus understood that the perforations 13 and 14 are disposed apart a distance corresponding to the width of the pass blank to insure the retaining of said blank in operative position in the frame.

It is intended that this frame shall be made of sheet celluloid, oiled, fiber or other tough, durable and pliable paper, or other material, and by any process of manufacture that will produce a frame of the shape and form substantially as illustrated in the drawing; and that the size and structure of the frame in the shape and form herein described and illustrated on the drawing may be changed, altered or varied from either to increase or decrease its dimensions as may be necessary for any uses to which it is adapted in writing separate passes, franks or other forms and making carbon counterparts of matter written thereon upon conforming record cards or other forms, without invalidating my claims.

To use my holder and frame for the purposes intended, the pass, frank or other form to be written, only, is placed in the frame by inserting the two upper corners thereof in the respective guiding and retaining apertures or openings formed by upper and lower left perforations (11 and 13) and connecting slit (15) and by upper and lower right perforations (12 and 14) and connecting slit (16), and forcing the pass, frank or other form up against the upper edges of the upper perforations (11 and 12), as shown in front view 2 and side perspective view 3 of the accompanying drawing. This secures and holds the pass, frank or other form in the frame so that it will be partly over the opening in the frame, is illustrated in view 2 of the drawing.

The frame with the pass, frank or other form thus secured in and combined with it is then placed in a typewriter or other writing device as though it were an ordinary sheet of paper, together with the printed conforming record cards or other forms of the required size, arrangement and number, with carbon paper as ordinarily used in manifolding properly inserted therein for making the required copies.

No special attachment or device is necessary to hold the frame with pass, frank or other form inserted therein and the record cards or other forms together when placing them in the typewriter or other writing device, although such attachment or device may be employed if desired.

When so placed in the typewriter or other writing device and adjusted to proper position, the pass, frank or other form in the frame is filled out in the usual manner, and by means of the opening in the frame and the carbon paper placed thereunder an exact counterpart of the matter written on the pass, frank or other form is transmitted, through the opening, to and impressed directly upon the record cards or other forms used in the conforming spaces provided thereon.

The pass, frank or other form, after being filled out as necessary, is then removed from the frame while it is still in the typewriter or other writing device, or may be left in the frame as desired, and the record cards or other forms are completed by writing on the back of the first carbon sheet in the opening of the frame and opposite the marginal lettering on the side faces of the frame, the additional data required to be shown on the record cards or other forms, which writing is in turn by the carbon paper impressed upon the record cards or other forms in the conforming spaces provided thereon; thus accomplishing by the use of this holder and frame (*a*) the filling out of separate passes, franks, or other forms, (*b*) the making of manifold counterparts of the matter written on the pass, frank or other form upon conforming record cards or other forms, and (*c*) the filling in of additional record or other data required to be shown on record cards or other forms after the pass, frank or other form is written, in one simultaneous operation upon a typewriter or other writing device; and, furthermore, providing a method by which carbon counterparts of matter written upon blanks or forms of one size used for any purpose may be transmitted by the use of carbon paper and impressed upon other blanks or forms of a larger size used for any such purpose, in one writing operation.

The employment of this pass, frank or form holder and writing frame for use in the issuing and writing of passes and franks and the making of record cards therefor in the manner herein outlined, and for other writing and manifolding purposes for which it may be used, will result in greater accuracy, efficiency and saving of labor and time (*a*) in the writing of such passes and franks and the making of required record thereof, and (*b*) in the writing and manifolding of other forms of varying sizes that may be used for other purposes; and will effect material economy (*a*) to the carriers by doing away with the labor now employed under present practices where the recording of passes or franks issued by them is done by an operation separate from their issuance or writing either by typewriting the record cards for each pass or frank issued or making the record thereof in book provided for the purpose, and (*b*) to others by eliminating at least one operation on a typewriter or other writing device in the writing of forms of varying sizes and arrangement used for any purpose; this economy being greater or less in the case of the carriers according to the number of passes or franks to be written and recorded each year, and in the case of others according to the purposes for which this holder and frame is employed.

This holder and frame is adapted for use in holding and writing passes or franks upon a typewriter of the kind and character now generally used by carriers, and will necessitate little, if any, modification in the weight, size or arrangement of the cards used for pass or frank purposes.

I claim:—

1. A form holder comprising a flexible sheet having an opening therein with obliquely disposed longitudinally spaced form-receiving slits arranged thereabove and terminating at their ends in apertures, said slits being inclined forwardly and toward each other, the walls of said slits normally contacting to form gripping elements for a form to be supported thereby, the apertures at the ends of said slits being designed to facilitate the insertion of the form to be supported, the distance between the inner remote ends of said slits corresponding to the width of the form to be inserted and held therein.

2. The combination with a form to be supported, of a holder therefor comprising a flexible sheet of larger size than said form and having an opening therein of greater width than the width of the form to be supported, said sheet having longitudinally spaced obliquely disposed form-receiving slits arranged above the opening therein and converging toward the adjacent edge of said sheet, the walls of said slits normally contacting to form gripping elements for said form, said slits being spaced from the lower edge of said opening a distance greater than the width of said form, whereby when the form is engaged with the holder, a space is provided between its lower edge and the lower edge of the opening in the holder to provide a writing space below the form, said holder having indicia disposed thereon outside the opening therein forming guides for the matter to be written on the form and on a blank disposed below the opening in said holder.

In testimony whereof I have hereunto set my hand in presence of two subscribing witnesses.

ERNEST L. SMITH.

Witnesses:
C. A. IVINSON,
J. L. CLEMONS.

Copies of this patent may be obtained for five cents each, by addressing the "Commissioner of Patents, Washington, D. C."